(12) United States Patent
Drooghaag et al.

(10) Patent No.: US 11,539,604 B2
(45) Date of Patent: Dec. 27, 2022

(54) METHOD AND APPARATUS FOR MONITORING A TELECOMMUNICATION NETWORK

(71) Applicant: Nokia Solutions and Networks Oy, Espoo (FI)

(72) Inventors: Benoit Drooghaag, Gosselies (BE); Olivier Delaby, Gosselies (BE)

(73) Assignee: Nokia Solutions and Networks Oy, Espoo (FI)

( * ) Notice: Subject to any disclaimer, the term of this patent is extended or adjusted under 35 U.S.C. 154(b) by 39 days.

(21) Appl. No.: 16/772,277

(22) PCT Filed: Mar. 4, 2019

(86) PCT No.: PCT/EP2019/055289
§ 371 (c)(1),
(2) Date: Jun. 12, 2020

(87) PCT Pub. No.: WO2019/174946
PCT Pub. Date: Sep. 19, 2019

(65) Prior Publication Data
US 2021/0092032 A1  Mar. 25, 2021

(30) Foreign Application Priority Data

Mar. 13, 2018 (EP) .................................. 18161387

(51) Int. Cl.
*H04L 41/0631* (2022.01)
*H04L 43/0817* (2022.01)
(Continued)

(52) U.S. Cl.
CPC ........ *H04L 43/0817* (2013.01); *H04L 1/0026* (2013.01); *H04L 41/0631* (2013.01);
(Continued)

(58) Field of Classification Search
CPC ............ H04L 43/0817; H04L 41/0631; H04L 43/045; H04L 43/16; H04L 1/0026
(Continued)

(56) References Cited

U.S. PATENT DOCUMENTS

| | | |
|---|---|---|
| 6,785,540 B1 | 8/2004 | Wichelman |
| 2007/0192474 A1* | 8/2007 | Decasper ............ H04L 67/1078 709/223 |

(Continued)

FOREIGN PATENT DOCUMENTS

| | | |
|---|---|---|
| EP | 2763388 A1 | 8/2014 |
| EP | 3128728 A1 | 2/2017 |

OTHER PUBLICATIONS

International Search Report PCT/ISA/210 and Written Opinion PCT/ISA/237 for International Application No. PCT/EP2019/055289 dated Apr. 5, 2019.
(Continued)

*Primary Examiner* — Meng Vang
(74) *Attorney, Agent, or Firm* — Harness, Dickey & Pierce, P.L.C.

(57) ABSTRACT

Embodiments relate to an apparatus for monitoring a telecommunication network including a plurality of telecommunication channels. The apparatus is configured to obtain operational data specifying the functioning of respective telecommunication channels for respective groups of telecommunication channels. The apparatus is configured to determine a difference between a number of impacted telecommunication channels in said group and an expected number of impacted telecommunication channels in said group, based on said operational data. The apparatus is configured to determine differences.

11 Claims, 3 Drawing Sheets

(51) Int. Cl.
*H04L 43/045* (2022.01)
*H04L 43/16* (2022.01)
*H04L 1/00* (2006.01)
*H04L 43/0876* (2022.01)

(52) U.S. Cl.
CPC ........ *H04L 43/045* (2013.01); *H04L 43/0876* (2013.01); *H04L 43/16* (2013.01)

(58) Field of Classification Search
USPC ...................................................... 370/252
See application file for complete search history.

(56) References Cited

U.S. PATENT DOCUMENTS

| | | | | |
|---|---|---|---|---|
| 2009/0190541 | A1* | 7/2009 | Abedi | H04W 16/10 370/329 |
| 2010/0085981 | A1* | 4/2010 | Gupta | H04L 45/245 370/419 |
| 2010/0110921 | A1 | 5/2010 | Famolari et al. | |
| 2010/0240407 | A1* | 9/2010 | Park | H04W 72/00 455/512 |
| 2010/0330919 | A1* | 12/2010 | Gurney | H04W 16/14 455/67.11 |
| 2013/0114425 | A1* | 5/2013 | Sayana | H04B 7/024 370/252 |
| 2016/0143025 | A1* | 5/2016 | Chen | H04W 72/10 370/329 |

OTHER PUBLICATIONS

Office Action for European No. 18 161 387.8 dated Feb. 15, 2021.
Office Action for European Application No. 18 161 387.8 dated Jun. 24, 2020.
Ragnar Stuhaug: "Implementation, Test, and Verification of a Specialized Real-Time Radio Protocol Chip: AtMega128RFA1, Application: AutoStore," Jul. 1, 2013 (Jul. 1, 2013), XP055407639, Retrieved from the Internet: URL:https://brage.bibsys.no/xmlui/bitstream/handle/11250/2400660/9999_FULL TEXT.pdf?sequence=1 &isAllowed=y [retrieved on Sep. 18, 2017].

* cited by examiner

| Group | StatScore | Nbad | Ntot | Nbad_th | Nexcess |
|---|---|---|---|---|---|
| AN01 | -9,05 | 27 | 658 | 12 | 15 |
| AN02 | -18,68 | 12 | 83 | 1 | 11 |
| AN03 | -4,88 | 19 | 563 | 10 | 9 |

← 10

| Group | StatScore | Nbad | Ntot | Nbad_th | Nexcess |
|---|---|---|---|---|---|
| CPE01 | -22,97 | 283 | 9880 | 190 | 93 |
| CPE02 | -21,37 | 38 | 635 | 12 | 26 |
| CPE03 | -3,56 | 407 | 20304 | 391 | 16 |

← 11

| Group | Nbad | Ntot | Nbad_th | Nexcess |
|---|---|---|---|---|
| PRO01 | 1400 | 59683 | 1151 | 249 |
| MOD03 | 683 | 27916 | 538 | 145 |
| CPE01 | 283 | 9880 | 190 | 93 |
| MOD06 | 194 | 6177 | 119 | 75 |

← 12

| Group | Nbad | Ntot | Nbad_th | Nexcess |
|---|---|---|---|---|
| LT02 | 145 | 3616 | 64 | 61 |
| CPE01 | 272 | 9236 | 216 | 56 |
| MOD06 | 194 | 6177 | 144 | 50 |
| MOD05 | 34 | 422 | 9 | 25 |

METHOD AND APPARATUS FOR MONITORING A TELECOMMUNICATION NETWORK

CROSS-REFERENCE TO RELATED APPLICATIONS

This application is a national phase under 35 U.S.C. § 371 of PCT International Application No. PCT/EP2019/055289 which has an International filing date of Mar. 4, 2019, which claims priority to European Application No. 18161387.8, filed Mar. 13, 2018, the entire contents of each of which are hereby incorporated by reference.

FIELD OF THE INVENTION

The present invention relates to the field of telecommunication. In particular, the present invention relates to a method and an apparatus for monitoring a telecommunication network.

BACKGROUND

An access network typically comprises telecommunication channels for connecting client devices to access nodes. An access network may rely for example on wireless technology, DSL technology, optical fiber technology and/or a combination thereof. New technologies have been introduced to increase the throughput, both on DSL (G.fast, MG.fast, . . . ) and fiber (NG-PON2, XGS-PON, . . . ). As those technologies are pushing the channel closer and closer to their physical limit, they are more and more sensitive to any infrastructure degradation, such as degraded binders for DSL or broken splitter port for fiber.

Therefore, solutions have been proposed to help network operators to monitor their networks, so that they can take the right actions to solve the problems as soon as possible, possibly anticipating end user issues and complains, hence reducing the churn rate and improving the quality of service perceived by the end users. The known solutions allow to quantify the number of customers suffering from bad performance or unstable link. However, identifying the main root causes of this bad quality, and even more prioritizing the repair actions remains a difficult, time-consuming and costly effort, because the amount of data collected on the network is huge and difficult to interpret by non-expert people.

SUMMARY

It is thus an object of embodiments of the present invention to propose a method and an apparatus for monitoring a telecommunication network, which do not show the inherent shortcomings of the prior art.

Accordingly, embodiments relate to an apparatus for monitoring a telecommunication network comprising a plurality of telecommunication channels, the apparatus comprising means configured for:
obtaining operational data specifying the functioning of respective telecommunication channels,
for respective groups of telecommunication channels, determining a difference between a number of impacted telecommunication channels in said group and an expected number of impacted telecommunication channels in said group, based on said operational data,
ranking groups based on the determined differences.

Also, embodiments relate to an apparatus for monitoring a telecommunication network comprising a plurality of telecommunication channels, the apparatus comprising at least one processor and at least one memory, the at least one memory storing computer program code, the at least one memory and the computer program code are configured for, with the at least one processor, cause the apparatus to at least perform:
obtaining operational data specifying the functioning of respective telecommunication channels,
for respective groups of telecommunication channels, determining a difference between a number of impacted telecommunication channels in said group and an expected number of impacted telecommunication channels in said group, based on said operational data,
ranking groups based on the determined differences.

Also, embodiments relate to a method for monitoring a telecommunication network comprising one or more telecommunication channels, the method comprising:
obtaining operational data specifying the functioning of respective telecommunication channels,
for respective groups of telecommunication channels, determining a difference between a number of impacted telecommunication channels in said group and an expected number of impacted telecommunication channels in said group, based on said operational data,
ranking groups based on the determined differences.

Embodiments may comprise determining (S2) whether a telecommunication channel is impacted by any impairment or not, based on the operational data.

Embodiments may comprise:
determining a ratio of impacted telecommunication channels,
determining the expected number of impacted telecommunications channels in a group as a function of said ratio and of the number of telecommunications channels in said group.

Embodiments may comprise determining a value of a performance indicator variable for a telecommunication channel, based on the operational data.

Embodiments may comprise:
determining a cumulative distribution function of said variable,
determining a cumulative distribution function of said variable over a group,
determining the expected number of impacted telecommunication channels in said group as a function of a maximum offset between said cumulative distribution function of said variable and said cumulative distribution function of said variable over said group.

Embodiments may comprise excluding groups based on a statistical test, wherein ranking groups comprises ranking non-excluded groups.

Embodiments may comprise:
obtaining user input data specifying the selection of one of the groups by a user,
repeating the determining of differences and ranking of groups for a dataset filtered based on the selected group.

Embodiments may comprise controlling the display of a ranked list of groups.

Embodiments may comprise:
selecting a repair action based on the ranked groups,
controlling the execution of said repair action.

In some embodiments, a group of telecommunication channels comprises telecommunication channels having a common technical feature and/or associated with a common element of the telecommunication network.

Embodiments also relate to a computer program comprising instructions for performing the method mentioned before when said instructions are executed by a computer. The computer program may be stored on a computer readable medium. The computer readable medium may be a non-transitory computer readable medium.

BRIEF DESCRIPTION OF THE DRAWINGS

The above and other objects and features of the invention will become more apparent and the invention itself will be best understood by referring to the following description of embodiments taken in conjunction with the accompanying drawings wherein:

FIG. 3 shows examples of tables that may be generated by the method of FIG. 2,

DESCRIPTION OF EMBODIMENTS

Figure 1:
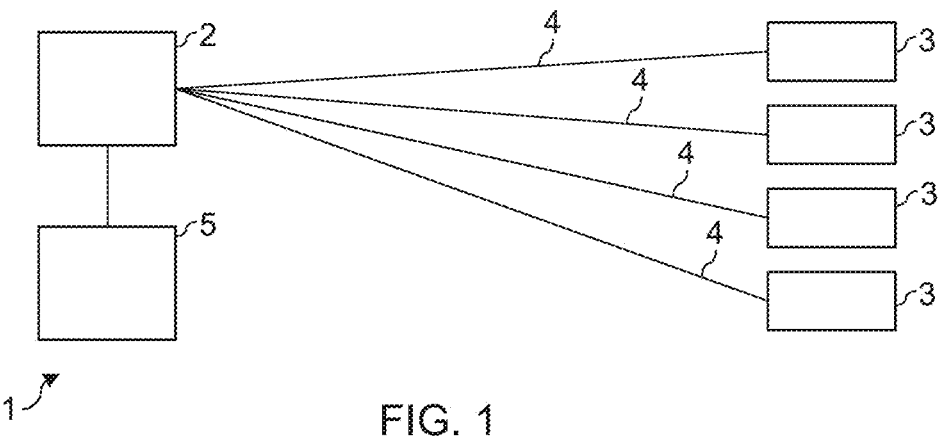
FIG. 1 is a block diagram of a telecommunication network.

FIG. 1 is a block diagram of a telecommunication network 1. The telecommunication network 1 comprises one or more access nodes 2 (only one of which is shown), a plurality of client devices 3, a plurality of telecommunication channels and a monitoring device 5. An access node 2 comprises a plurality of ports to which respective client devices 3 are connected through a telecommunication channel.

A telecommunication channel may be a wireless channel, a telecommunication line or a combination of one or more wireless channel and/or one or more telecommunication line. The following description refers to telecommunication lines 4 connecting an access node 2 and respective client devices 3, but embodiments also include wireless channels, telecommunication lines and combinations.

In some embodiments, a telecommunication line 4 is a DSL line. An access node 2 and a client device 3 are configured for communication through the DSL line using DSL technology, such as ADSL, VDSL2, G.FAST . . . . An access node 2 is for example a DSLAM and a client device 3 is for example a CPE, a DSL modem . . . .

In some embodiments, a telecommunication line 4 is a power line configured for distribution of electrical power. An access node 2 and a client device 3 are configured for communication through the power line using Power Line Communication (PLC) technology.

In some embodiments, a telecommunication line 4 is an optical fiber. An access node 2 and a client device 3 are configured for communication through the optical fiber using fiber technology, such as G-PON, NG-PON, XGS-PON . . . .

An access node 2 provides operational data describing the functioning of its ports (or in other words, of the connected telecommunication lines 4). The operational data specifies and/or allows the monitoring device 5 to determine operating parameters of the telecommunications lines. Example of operating parameters includes the bitrate, a mean time between errors, a mean time between resynchronizations, a line state (such as God/Bad, Stable/Unstable) . . . . Usually, these operational parameters are available for each client device 3 (each port or telecommunication line 4) at regular time interval (e.g. daily, or every 15-min).

In the telecommunication network 1, telecommunication lines 4 are associated with (or are included in) respective groups. A group relates to a technical feature or element of the telecommunication network 1, and the telecommunication lines 4 associated with a given technical feature or element are included in the corresponding group. For example, the telecommunication lines 4 connected to the same access node 2 are included in the group of said access node 2. The monitoring device 5 is configured for determining which groups are associated with a given telecommunication line 4, and which telecommunication lines 4 are included in a given group. For this purpose, for example, the operational data includes element identifier (such as Access node ID, Line Card ID, Port ID . . . ), metadata describing technical features (such Software version, technology used . . . ) and/or the monitoring device 5 has access to such data and topology data about of the telecommunication network 1, for example from a database maintained by the network operator. This allows determining the group-telecommunication line 4 relationships.

Examples of groups for DSL are Access node name, LT board, binder, client device type, LT board type, Access node/CPE software release, vectoring group, . . . . Similarly, examples group for fiber are Access node name, LT board, PON id, ONT type, LT board type, Access node/ONT software version, splitter id, . . . . In some embodiments, some geographical group can also be defined (street, suburb, district . . . )

In some embodiments, the groups are organized in a hierarchy. For example, the group of an access node can be subdivided in the groups of its LT board. A group of a LT board can be subdivided in groups of binders . . . .

The telecommunication lines 4 may be affected by various impairments, which reduce the quality of service, for example reduced bitrate. A network operator may perform various repair action to improve the quality of service of telecommunication lines 4 affected by impairments. However, a given repair action may improve the situation only for a small number of telecommunication lines 4, while another given repair action may improve the situation for a larger number of telecommunication lines 4. Accordingly, for the network operator, it is desirable to prioritize the possible repair actions. The monitoring device 5 is configured for obtaining operational data from the access nodes 2 and for ranking groups of telecommunication lines 4 based on the operational data. The ranked groups allow prioritizing possible repair actions. The functioning of the monitoring device 5 is described hereafter in more details with reference to FIG. 2 to 6.

The criterion that the monitoring device 5 tend to optimize can be any service-related KPI such as, for DSL, the number of unstable ports, the number of under-performing ports, the average MTBE, MTBR or bitrate. Similarly, the criterion for fiber network can be the number of unstable/abnormal optical links, the number of malfunctioning ONTs, average MTBE, number of ONT with an abnormal temperature, number of connector/fiber issues, . . . .

Figure 2:
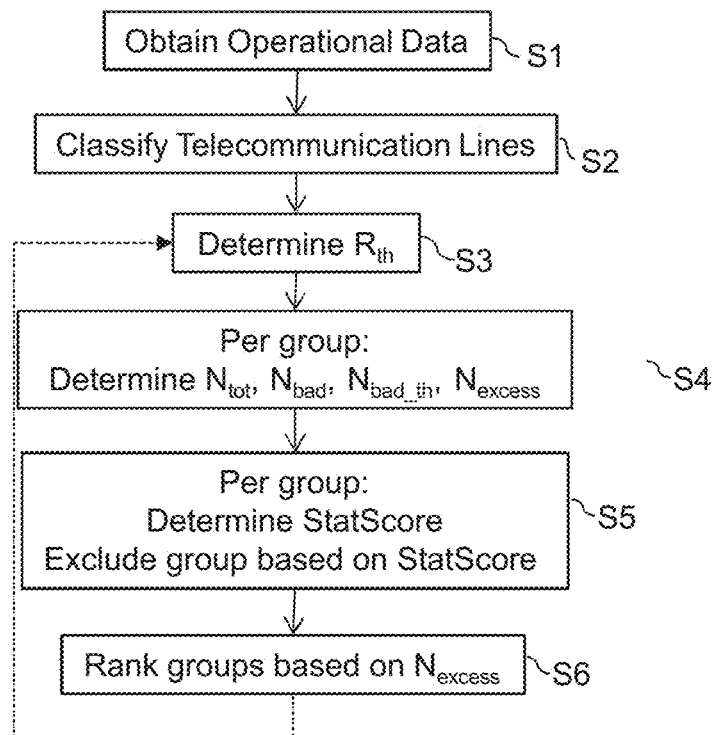
FIG. 2 is a flowchart of a method for monitoring a telecommunication network.

FIG. 2 is a flowchart of a method for monitoring the telecommunication network 1, executed by the monitoring device 5. This example uses an assessment of the telecommunication lines 4 based on a binary classification.

The monitoring device 5 obtains operational data specifying the functioning of telecommunication lines 4 (Step S). The operational data specify operational parameters such as bitrate, number of errors, configuration . . . . For example, an access node 2 and/or a client device 3 sends one or more reports with (part of) the operational data to the monitoring device 5.

The monitoring device 5 classifies the telecommunication lines 4 based on the operational data (Step S2). In this embodiment, we consider a binary classification between lines regarded as non-impacted by impairments and lines regarded as impacted by at least one impairment. This can correspond to two class labels such as Good/Bad or Stable/Unstable. Note that this may results from a more detailed classification: for example, if another process executed by the monitoring device 5 classifies the telecommunication lines 4 as Stable/Risky/Unstable, the Risky and Unstable class may be merged for the present method. Various techniques may be applied for this classification. Some techniques involve comparing operational parameters, or values derived from operational parameters, with predetermined thresholds. Other techniques involve the use of a trained machine learning model for classification.

Accordingly, the monitoring device 5 generates a dataset including a plurality of samples. A sample relates to a telecommunication line 4 and specifies the classification label (Good/Bad) of the telecommunication line 4 and the one or more groups to which the telecommunication line 4 belongs.

The monitoring device 5 determines a ratio of impacted telecommunication lines 4 (Step S3):

$$R_{th} = \#Bad/(\#Bad + \#Good)$$

where #Bad and #Good represent the number of telecommunication lines respectively classified as Bad or Good. Initially, the ratio $R^{th}$ is determined for all the telecommunication lines 4 considered at steps S1 and S2, for example all the lines of the telecommunication network 1. When step S3 is repeated for a filtered dataset as explained hereafter, ratio $R_{th}$ is determined for the telecommunication lines 4 in the filtered dataset.

The monitoring device 5 determines, for respective groups of telecommunication lines 4, a difference between a number of impacted telecommunications lines 4 in said group and an expected number of impacted telecommunications lines 4 in said group (Step S4). For example, for a given group of telecommunication lines 4, the monitoring device 5 determines:
- $N_{tot}$, the number of telecommunication lines 4 (or of ports/links) in the group
- $N_{bad}$, the number of telecommunication lines 4 (or of ports/links) classified as Bad in the group
- $N_{bad\_th} = N_{tot} * R_{th}$, an expected number of telecommunication lines 4 (or of ports/links) classified as Bad in the group
- $N_{excess} = N_{bad} - N_{bad\_th}$, a number of bad ports (or bad telecommunication lines 4) in excess In this example, $N_{excess}$ is the difference between the actual number of impacted telecommunication lines 4 in the group and the number of impacted telecommunication lines 4 in the hypothetical situation wherein the impacted lines are evenly distributed in all the groups. In other words, $N_{excess}$ represents a difference between a number of impacted telecommunication lines 4 in the group and an expected number of impacted telecommunication lines 4 in the group.

The monitoring device 5 assess a statistical test for the respective groups, and exclude the groups which do not satisfy the statistical test (Step S5). More specifically, a group is excluded if the statistical test shows that it is not statistically meaningful. The statistical test may comprise determining a statistical score for the group and comparing it with a threshold. In this example based on a binary classification, the statistical test may be for example a binomial test or a chi-squared test.

In the case of the binomial test, the monitoring device 5 determines the probability to get less stable/good ports than observed (in other words, less telecommunication lines 4 classified as Good or Stable than observed) by random using binomial low cumulative distribution function:

$$Pr(X \le k) = \sum_{i=0}^{\lfloor k \rfloor} \binom{n}{i} p^i (1-p)^{n-1}$$

where $k = N_{bad}$, $n = N_{tot}$, $p = R_{th}$.

The groups with probability higher than a threshold (for example the groups with $Pr(X \le k) > 1e-6$) are excluded. In some embodiments, the statistical score StatScore of a group is the logarithm of the probability Pr, and the threshold is adapted correspondingly. For example, the test is: $\log Pr > -6$.

The computation of the probability Pr above may be complex and/or unstable, due to the need to compute the ratio of two very high numbers. Accordingly, Pearson's Chi-squared test is a good alternative for large population (>30 samples). Because of the weakness of this test on small groups (<30 samples), those small groups are systematically excluded. As the main purpose of the method is to identify the groups with the highest number of impacted customers, this restriction is not really a problem. Applying the Pearson's chi-squared test to a binary classification problem simply boils down to computing the following score StatScore, for every group:

$$\text{Chi-squared score} = (N_{bad} - N_{bad\_th})^2 / N_{bad\_th}$$

The larger the score, the more meaningful is the deviation. The groups having a score below a certain threshold can be excluded of the invention. A theoretical value for the threshold can be derived from the p-values of the chi-squared distribution with one degree of freedom (for example, a threshold of 10.83 correspond to a confidence of 99.9%).

Then, the monitoring device 5 ranks the remaining groups (the groups that have not been excluded at step S5) based on $N_{excess}$ (Step S6). The group (or the N groups) with the highest $N_{excess}$ value(s) allow determining the repair actions to be prioritized. For example, if the group of a given access node 2 has the largest $N_{excess}$ value, a repair action targeted to this access node 2 (e.g. including sending a field technician to the access node location) may be prioritized.

Accordingly, in some embodiments, the monitoring device 5 displays information based on ranked list of groups. For example, the monitoring device 5 displays the ranked list of N groups with the highest $N_{excess}$ values, to allow the network operator to schedule and prioritize the appropriate repair actions. In some embodiments, the monitoring device 5 displays a map showing the positions of the network elements associated with the ranked list of N groups with the highest $N_{excess}$ values. Also, in some embodiments, the monitoring device 5 triggers a repair action in response to identifying one or more groups with the highest $N_{excess}$ values. For example, the monitoring device 5 controls an access node 2 for changing its configuration, such as using a configuration less sensitive to noise etc.

In some embodiments, the monitoring device 5 obtains user input data specifying the selection of one of the groups by a user. In response, the monitoring device repeats steps S3 to S6 based on a dataset filtered on the selected group.

This allows to perform a "drill-down" to "zoom in" one of the most impacting groups, refining the source of the issue and possible improvement. The idea is here re-feed the method with a data set filtered on a group identified by a previous run. This can be repeated iteratively.

For example, consider that a first run of the method is pointing the VDSL2 17 MHz profile as main source of instability, a drill-down analysis can be performed by re-running the same method but considering only the VDSL2 17 MHz ports instead of the entire telecommunication network 1. By doing so, a second ranked list of groups is obtained, pointing now to a given VDSL2 LT board and a specific VDSL2 CPE as main reasons of instability in VDSL2.

Similarly, for an example on bad optical links in a PON fiber network, drilling-down on a bad ONT identified by a first run of the method as the main cause of bad links may shows where that bad ONT is impacting the most customers (in which access node for example).

FIG. 3 shows tables generated and/or displayed by the monitoring device 5 during execution of the method of FIG. 2. For simplicity, only the first few lines of the tables are shown. This example relates to DSL.

Tables 10 and 11 show the data determined at step S4 and S5 for respective access nodes 2 and types of client devices 3. Other similar tables may be determined for other types of groups (modem type, DSL profile, LT board . . . ). In this example, StatScore is the logarithm of the probability Pr and groups with a StatScore greater than −6 are excluded.

Table 12 is determined at step S6 by merging tables 10, 11 and similar tables for other types of groups excluding groups based on the StatScore value and ranking groups based on the $N_{excess}$ values. In this example, table 12 shows that a VDSL profile with profile identifier PRO01 and a modem type with modem identifier MOD03 are the main sources of instability in the network, impacting respectively 249 and 145 additional clients.

Table 13 is determined in response to receiving a user input specifying the selection of the first line of Table 12. The monitoring device 5 repeats steps S3-S6 with a dataset filtered on DSL profile=PRO01 and generates table 13 at step S6. This points to a specific LT board with identifier LT02 and a client device type with identifier CPE01 has the main sources of issues.

In this example, a network operator may decide to prioritize a repair action targeted to the LT Board LT2. This will improve the situation of a large number of client devices 3.

Figure 4:
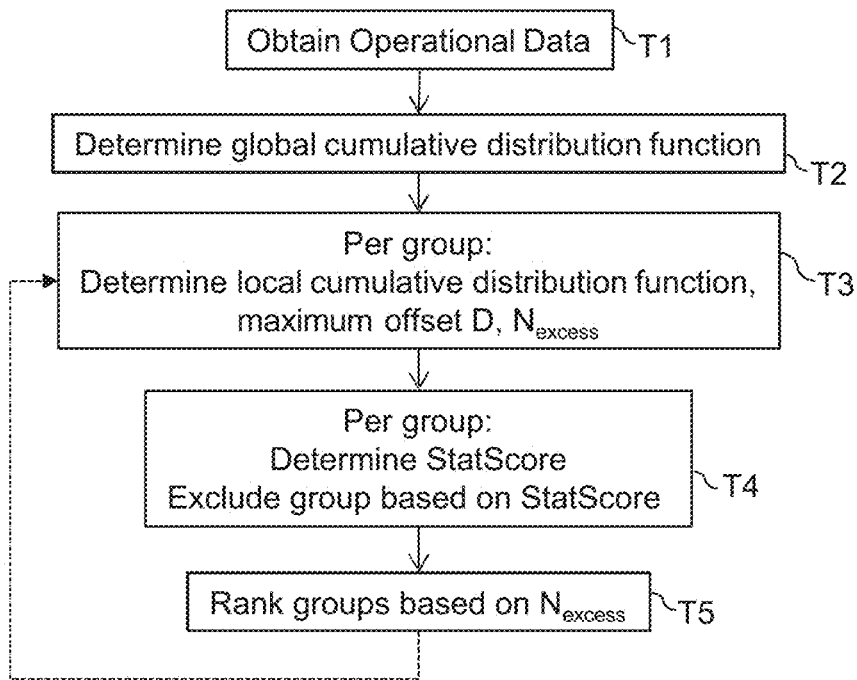
FIG. 4 is a flowchart of a method for monitoring a telecommunication network.

FIG. 4 is a flowchart of a method for monitoring the telecommunication network 1, executed by the monitoring device 5. This example uses an assessment of the telecommunication lines 4 based on a continuous variable X, such as bitrate, Mean Time Between Error (MTBE), Mean Time Between Resynchronizations (MTBR) . . . .

The monitoring device 5 obtains operational data specifying the functioning of telecommunication lines 4 (Step T). The operational data specify operational parameters such as bitrate, number of errors, configuration . . . . For example, an access node 2 and/or a client device 3 sends one or more reports with (part of) the operational data to the monitoring device 5. The monitoring device 5 determines the value of the variable X for the respective telecommunication lines 4, based on the obtained operation data. For example, monitoring device 5 computes the bitrate, MTBE, MTBR . . . .

Accordingly, the monitoring device 5 generates a dataset including a plurality of samples. A sample relates to a telecommunication line 4 and specifies the value of the variable X for the telecommunication line 4 and the one or more groups to which the telecommunication line 4 belongs.

Figure 5:
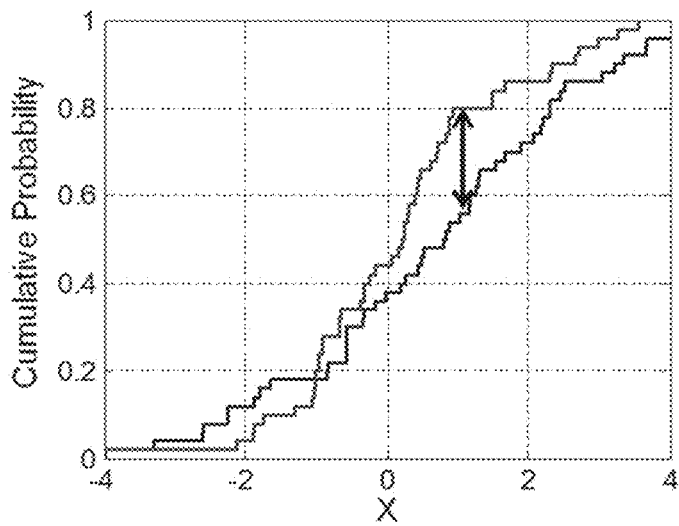
FIG. 5 is a graph of cumulative distribution functions, illustrating steps of the method of FIG. 4.

The monitoring device 5 determines the cumulative distribution function (CDF) of the variable X over the dataset (Step T2). This is referred to as the global CDF. In some embodiment, the variable X is normalized such that its mean is zero. In the graph of FIG. 5, the curve 14 shows an example of the cumulative distribution function of the normalized variable X.

The monitoring device 5 determines, for respective groups of telecommunication lines 4, a difference between a number of impacted telecommunications lines 4 in said group and an expected number of impacted telecommunications lines 4 in said group (Step T3). For example, for a given group of telecommunication lines 4, the monitoring device 5 determines:

$N_{tot}$, the number of telecommunication lines 4 (or of ports/links) in the group The Cumulative Distribution Function of the variable X, computer only over the group. This is referred to as the local CDF. The variable X is normalized by subtracting the mean computed at step T2 for normalizing the variable X globally. Accordingly, the curve 15, which shows an example of the cumulative distribution function of the normalized variable X computer over the given group, can be compared with the curve 14.

The biggest offset D between the curves 14 and 15.

$N_{excess} = D * N_{tot}$

In this example, $N_{excess}$ is based on an maximum offset between the global CDF (curve 14) and the local CDF (curve 15), multiplied by the number of telecommunication lines 4 in the group. Accordingly, $N_{excess}$ represents a difference between a number of impacted telecommunications lines 4 in the group and an expected number of impacted telecommunications lines 4 in the group.

The monitoring device 5 assess a statistical test for the respective groups, and exclude the groups which do not satisfy the statistical test (Step T4). More specifically, a group is excluded if the statistical test shows that it is not statistically meaningful. The statistical test may comprise determining a statistical score StatScore for the group and comparing it with a threshold. In this example based on a continuous variable X, the statistical test may be for example a Kolmogorov-Smirnov (KS) test:

$$D > c(\alpha)\sqrt{\frac{n+m}{nm}}$$

where $c(\alpha)$ is a parameter representing the confidence level of the test (e.g. $c(\alpha)=1.63$ for 99% confidence), n is the number of samples in the group (that is the number of telecommunication lines 4 in the group Not), and m is the global number of samples (the total number of considered telecommunication lines 4).

Then, the monitoring device 5 ranks the remaining groups (the groups that have not been excluded at step T4) based on $N_{excess}$ (Step T5). As in the example of FIG. 2, the group (or the N groups) with the highest $N_{excess}$ value(s) allow determining the repair actions to be prioritized.

Accordingly, in some embodiments, the monitoring device 5 displays information based on the ranked list of groups. For example, the monitoring device 5 displays the ranked list of N groups with the highest $N_{excess}$ values, to allow the network operator to schedule and prioritize the appropriate repair actions. For example, the monitoring device 5 displays a map showing positions of the network elements associated with the ranked list of N groups with the highest $N_{excess}$ values. Also, in some embodiments, the monitoring device 5 triggers a repair action in response to identifying one or more groups with the highest $N_{excess}$ values. For example, the monitoring device 5 controls an access node 2 for changing its configuration, such as using a configuration less sensitive to noise etc.

In some embodiments, the monitoring device 5 obtains user input data specifying the selection of one of the groups by a user. In response, the monitoring device repeats steps T3 to T5 based on a dataset filtered on the selected group. This allows to perform a "drill-down" to "zoom in" one of the most impacting groups, refining the source of the issue and possible improvement. The idea is here re-feed the method with a data set filtered on a group identified by a previous run. This can be repeated iteratively.

In the telecommunication network 1, the monitoring device 5 determines, for respective groups of telecommunication lines 4, a difference between a number of impacted telecommunications lines in a group and an expected number of impacted telecommunications lines in said group. This allows identifying one or more groups for which a targeted repair action would have a positive impact on the largest number of telecommunication lines 4. By comparison, ranking groups based on the number of impacted telecommunications lines would tend to point to the biggest groups, and ranking groups based on the ratio between the number of impacted telecommunications lines and the total number of telecommunications lines in said group would tend to point to the smallest groups.

Moreover, by filtering groups based on a statistical test, groups for which a deviation of the assessment criterion is not statistically meaningful can be excluded. This reduce the complexity of the data analysis task.

Also, by repeating the process based in a dataset filtered based on a selected group, the monitoring device 5 allows to refining the identification of the most impacting group, thereby providing for an identification of a root cause.

It should be noted that although examples of methods have been described with a specific order of step, this does not exclude other implementations. In particular, the described steps may be executed in another order, partially or totally in parallel . . . .

Figure 6:
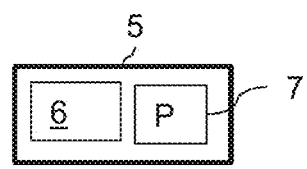
FIG. 6 is structural view of a monitoring device.

FIG. 6 is a structural view of the monitoring device 5, which comprises at least one processor 6 and at least one memory 7. The at least one memory 7 stores computer program code P. The at least one memory 7 and the computer program code are configured for, with the at least one processor 6, cause the monitoring device to at least perform the method described above with reference to FIGS. 1 to 5.

It is to be remarked that the functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared, for example in a cloud computing architecture. Moreover, explicit use of the term "processor" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Their function may be carried out through the operation of program logic, through dedicated logic, through the interaction of program control and dedicated logic, or even manually, the particular technique being selectable by the implementer as more specifically understood from the context.

It should be further appreciated by those skilled in the art that any block diagrams herein represent conceptual views of illustrative circuitry embodying the principles of the invention. Similarly, it will be appreciated that any flow charts represent various processes which may be substantially represented in computer readable medium and so executed by a computer or processor, whether or not such computer or processor is explicitly shown.

While the principles of the invention have been described above in connection with specific embodiments, it is to be clearly understood that this description is made only by way of example and not as a limitation on the scope of the invention, as defined in the appended claims.

The invention claimed is:

1. An apparatus for monitoring a telecommunication network including a plurality of telecommunication lines, the apparatus comprising:
a processor configured to execute program code and cause the apparatus to perform operations of,
obtaining operational data specifying functioning of respective telecommunication lines,
for respective groups of telecommunication lines,
classifying the telecommunication lines, based on said operational data, as either impacted by an impairment or not impacted by an impairment, in a binary manner,
determining a number of the telecommunication lines impacted by an impairment in said group based on the classifying, and
determining a difference between the number of telecommunication lines impacted by an impairment in said group and an expected number of telecommunication lines impacted by an impairment in said group, wherein a group of telecommunication lines comprises telecommunication lines having a common technical feature and/or associated with a common element of the telecommunication network, wherein the expected number of telecommunication lines impacted by an impairment represents an hypothetical situation wherein the impacted lines are evenly distributed in the groups,
ranking groups based on the determined differences,
causing display of a ranked list of groups,
selecting a repair action based on the ranked groups, and
controlling the execution of said repair action.

2. The apparatus according to claim 1, wherein said processor is further configured to cause the apparatus to:
determine a ratio of impacted telecommunication lines,
determine the expected number of impacted telecommunications lines in a group as a function of said ratio and of the number of telecommunications lines in said group.

3. The apparatus according to claim 1, wherein said processor is further configured to cause the apparatus to:
determine a value of a performance indicator variable for a telecommunication line, based on the operational data.

4. The apparatus according to claim 3, wherein said processor is further configured to cause the apparatus to:

determine a cumulative distribution function of said variable, determine a cumulative distribution function of said variable over a group, and determine the expected number of impacted telecommunication lines in said group as a function of a maximum offset between said cumulative distribution function of said variable and said cumulative distribution function of said variable over said group.

5. The apparatus according to claim 1, wherein said processor is further configured to cause the apparatus to:

exclude groups based on a statistical test, wherein ranking groups comprises ranking non-excluded groups.

6. The apparatus according to claim 1, wherein said processor is further configured to cause the apparatus to:

obtain user input data specifying selection of one of the groups by a user, and repeat the determining of differences and ranking of groups for a dataset filtered based on the selected group.

7. A method for monitoring a telecommunication network comprising one or more telecommunication lines, the method comprising:

obtaining operational data specifying functioning of respective telecommunication lines, for respective groups of telecommunication lines, classifying the telecommunication lines, based on said operational data, as either impacted by an impairment or not impacted by an impairment, in a binary manner, determining a number of the telecommunication lines impacted by an impairment in said group based on the classifying, and determining a difference between the number of telecommunication lines impacted by an impairment in said group and an expected number of telecommunication lines impacted by an impairment in said group, wherein a group of telecommunication lines comprises telecommunication lines having a common technical feature and/or associated with a common element of the telecommunication network, ranking groups based on the determined differences, and displaying a ranked list of groups, selecting a repair action based on the ranked groups, and controlling the execution of said repair action.

8. The method according to claim 7, further comprising:
determining a ratio of impacted telecommunication lines, and determining the expected number of impacted telecommunications lines in a group as a function of said ratio and of the number of telecommunications lines in said group.

9. The method according to claim 7, further comprising:
excluding groups based on a statistical test, wherein ranking groups comprises ranking non-excluded groups.

10. The method according to claim 7, further comprising:
obtaining user input data specifying selection of one of the groups by a user, and repeating the determining of differences and ranking of groups for a dataset filtered based on the selected group.

11. A non-transitory computer readable medium storing instructions, that when executed by a computer, cause an apparatus including the computer to perform the method of claim 7.

* * * * *